(12) United States Patent
Guo et al.

(10) Patent No.: US 8,331,466 B2
(45) Date of Patent: Dec. 11, 2012

(54) METHOD AND SYSTEM FOR ADAPTIVE PEAK TO AVERAGE POWER RATIO REDUCTION IN ORTHOGONAL FREQUENCY DIVISION MULTIPLEXING COMMUNICATION NETWORKS

(75) Inventors: Ning Guo, Kanata (CA); Neil McGowan, Stittsville (CA); Bradley John Morris, Ottawa (CA)

(73) Assignee: Apple, Inc., Cupertino, CA (US)

(*) Notice: Subject to any disclaimer, the term of this patent is extended or adjusted under 35 U.S.C. 154(b) by 942 days.

(21) Appl. No.: 12/245,047

(22) Filed: Oct. 3, 2008

(65) Prior Publication Data

US 2009/0092195 A1      Apr. 9, 2009

Related U.S. Application Data (60) Provisional application No. 60/977,403, filed on Oct. 4, 2007.

(51) Int. Cl.
   *H04K 1/10* (2006.01)
(52) U.S. Cl. ........... 375/260; 375/259; 370/233; 367/29
(58) Field of Classification Search .................. 375/260
   See application file for complete search history.

(56) References Cited

U.S. PATENT DOCUMENTS

| | | | |
|---|---|---|---|
| 6,741,661 B2 | 5/2004 | Wheatley, III et al. | |
| 7,333,563 B2* | 2/2008 | Chan et al. | 375/297 |
| 7,409,009 B2* | 8/2008 | Akhtman | 375/296 |
| 7,583,583 B2* | 9/2009 | Guo et al. | 370/204 |
| 7,675,982 B2* | 3/2010 | Zhang et al. | 375/260 |
| 7,920,635 B2* | 4/2011 | Piirainen | 375/260 |
| 7,944,991 B2* | 5/2011 | Zhao et al. | 375/296 |
| 7,949,059 B2* | 5/2011 | Devlin et al. | 375/260 |
| 2005/0163248 A1* | 7/2005 | Berangi et al. | 375/296 |
| 2005/0169411 A1 | 8/2005 | Kroeger | |
| 2006/0209805 A1 | 9/2006 | Mahdi et al. | |
| 2006/0250936 A1* | 11/2006 | Chen et al. | 370/208 |
| 2007/0089015 A1* | 4/2007 | Saul | 714/746 |
| 2007/0140101 A1* | 6/2007 | Guo et al. | 370/204 |
| 2007/0217543 A1* | 9/2007 | Hamada et al. | 375/296 |
| 2007/0258528 A1* | 11/2007 | Kwun et al. | 375/260 |
| 2008/0019453 A1* | 1/2008 | Zhao et al. | 375/260 |
| 2008/0089437 A1* | 4/2008 | Frederiksen et al. | 375/296 |
| 2008/0112496 A1* | 5/2008 | Devlin et al. | 375/260 |
| 2008/0233901 A1* | 9/2008 | Ebiko et al. | 455/114.2 |
| 2008/0247487 A1* | 10/2008 | Cai et al. | 375/296 |
| 2008/0285432 A1* | 11/2008 | Ueng et al. | 370/203 |

(Continued)

OTHER PUBLICATIONS

International Search Report and Written Opinion dated Jan. 29, 2009 for International Application No. PCT/CA2008/001757, International Filing Date Oct. 3, 2008 (9-pages).

(Continued)

*Primary Examiner* — David Ometz
*Assistant Examiner* — Santiago Garcia
(74) *Attorney, Agent, or Firm* — Meyertons, Hood, Kivlin, Kowert & Goetzel, P.C.; Eric B. Meyertons (57) ABSTRACT

A method and system adaptively reduce a peak-to-average power ratio in a communication system. Energy is clipped from at least one peak of a modulated signal. The modulated signal includes a plurality of sub-carriers. At least one data sub-carrier is adaptively selected for peak-to-average power ratio reduction use based on known scheduling information. The clipped energy is distributed among at least one data sub-carrier.

18 Claims, 3 Drawing Sheets

U.S. PATENT DOCUMENTS

2010/0046662 A1* 2/2010 Park et al. .................. 375/295
2011/0182377 A1* 7/2011 Fujii et al. .................. 375/267

OTHER PUBLICATIONS

Ren et al., "A Complementary Clipping Transform Technique for the Reduction of Peak-to_average Power Ratio of OFDM System", IEEE Transactions on Consumer Electronics, vol. 49(4) (Nov. 2003).

Rajbanshi et al., "Subcarrier Power Adjustment Technique for Peak-to-Average Power Ratio Reduction of OFDM Systems," Military Communications Conference, 2006.MILCOM 2006, pp. 1-6 Entire Document, (Oct. 23-25, 2006).

CN Application No. 200880116631.2, "Office Action Mailed Jun. 20, 2012," Application date Mar. 10, 2008.

\* cited by examiner

METHOD AND SYSTEM FOR ADAPTIVE PEAK TO AVERAGE POWER RATIO REDUCTION IN ORTHOGONAL FREQUENCY DIVISION MULTIPLEXING COMMUNICATION NETWORKS

CROSS-REFERENCE TO RELATED APPLICATION

This application is related to and claims priority to U.S. Provisional Application Ser. No. 60/977,403, filed Oct. 4, 2007, entitled ADAPTIVE PAPR REDUCTION, the entirety of which is incorporated herein by reference.

STATEMENT REGARDING FEDERALLY SPONSORED RESEARCH OR DEVELOPMENT n/a

FIELD OF THE INVENTION

The present invention relates generally to a method and system for power control in communication systems and more specifically to a method and system for reducing the peak-to-average power ratio ("PAPR") by adaptively distributing excess energy among reserved and active sub-carriers in orthogonal frequency-division multiplexing ("OFDM") communication systems.

BACKGROUND OF THE INVENTION

The use of Orthogonal Frequency Division Multiplexing ("OFDM") technology is ever increasing within wireless applications such as cellular and Personal Communication Systems ("PCS") due to its reliability and high spectral efficiency. OFDM has a high tolerance to multipath signals and is spectrally efficient which makes it a good choice for wireless communication systems. OFDM has gained considerable interest in diverse digital communication applications due to its favorable properties like high spectral efficiency, robustness to channel fading, immunity to impulse interference, uniform average spectral density, and capability of handling very strong echoes. OFDM technology is now used in many new broadband communication schemes and many other wireless communication systems.

More specifically, OFDM is a special form of multicarrier modulation that uses Digital Signal Processor ("DSP") algorithms such as Inverse Fast Fourier Transform ("IFFT") to generate waveforms that are mutually orthogonal and Fast Fourier Transform ("FFT") for demodulation operations.

However, there are some concerns with regard to OFDM. Such concerns include high Peak-to-Average Power Ratio ("PAPR") and frequency offset. A high PAPR causes saturation in power amplifiers, leading to intermodulation products among the subcarriers and disturbances of out-of-band energy. Therefore, it is desirable to reduce the PAPR. In order to meet the out-of-band emissions requirements, a power amplifier and other components with this high PAPR input are required to provide good linearity in a large dynamic range. This power requirement makes the power amplifier one of the most expensive components within the communication system. The high PAPR also means that the power amplifier operation has low power efficiency that reduces battery life for related mobile stations. An elevated PAPR for infrastructure amplifiers increases power consumption and heat generation, compromising system reliability and limiting deployment options due to system cooling requirements.

An OFDM signal exhibits a high PAPR because the independent phases of the sub-carriers mean that the sub-carrier signals may often combine constructively allowing the peak of the signal to be up to N times the average power (where N is the number of sub-carriers). These large peaks increase the amount of intermodulation distortion resulting in an increase in the error rate. The average signal power must be kept low in order to prevent transmitter amplifier gain limiting. Minimizing the PAPR allows a higher average power to be transmitted for a fixed peak power, improving the overall signal to noise ratio at the receiver. It is therefore desirable to reduce or otherwise minimize the PAPR.

Traditionally, in order to handle a high PAPR, a system uses a linear signal chain. Any non-linearity in the signal chain will cause intermodulation distortion and degrades signal quality. The linearity requirement is demanding, especially for transmitter RF output circuitry where amplifiers are often designed to be non-linear in order to minimize power consumption.

Prior PAPR reduction methods may be classified into two groups including Constellation Shaping ("CS"), e.g., distortionless or active constellation expansion, and Tone Reservation ("TR"). With CS methods, the modulation constellation is changed such that the obtained PAPR is less than the required value with the satisfied channel error criteria. With TR methods, the reserved tones are assigned with such values that the obtained PAPR is less than the required value with the satisfied channel error criteria. In the tone reservation method, the idea is to reserve a small set of tones, or sub-carriers, for PAPR reduction. The amount of PAPR reduction depends on the number of reserved tones, their locations within the frequency vector, and the amount of complexity. Other methods of reducing PAPR are also possible but they affect signal quality or Error-Vector Magnitude ("EVM"). One such method is disclosed in United States Patent Publication No. 2007/0140101, to Guo et al., published Jun. 21, 2007 and entitled "System and Method for Reducing Peak-to-Average Power Ratio in Orthogonal Frequency Division Multiplexing Signals using Reserved Spectrum," the entire teachings of which are hereby incorporated by reference.

In practical OFDM systems, a small amount of peak clipping is allowed to limit the PAPR in a tradeoff against linearity and power consumption. However, the transmitter output filter, which is required to reduce out-of-band spurs to legal levels, has the tendency to regrow peak levels that were clipped, thus clipping alone has not been an effective way to reduce PAPR. One method of TR PAPR reduction clips the peak signal and limits signal re-growth by distributing the excess clipped energy among the known reserved sub-carriers while preventing this distortion or noise to affect any active sub-carriers, i.e., sub-carriers carrying user data. However, at any given time, not every "active" or non-reserved sub-carrier is actually carrying data or would be adversely affected by the addition of a small amount of noise. Additionally, although having a high number of reserved sub-carriers for energy distribution aids in reducing the overall PAPR, the result is that there are fewer sub-carriers available to carry data. Thus, prior TR methods also decrease the potential system capacity.

Therefore, what is needed is a system and method for reducing the peak-to-average power ratio of OFDM communication systems by adaptively distributing excess clipped energy among reserved and active sub-carriers.

SUMMARY OF THE INVENTION

The present invention advantageously provides a method and system for reducing the peak-to-average power ratio in orthogonal frequency division multiplexing communication systems. Generally, the peak energy of a signal carrying an OFDM symbol is clipped and the clipped energy is distributed among a combination of reserved sub-carriers and data-carrying sub-carriers. The clipped signal is passed through a filter created in the frequency domain which has coefficients determined based on known information from a scheduler concerning the composition of the signal, e.g., the total number of sub-carriers, the amount of sub-carriers for each modulation scheme, whether a sub-carrier currently carries data, etc.

In accordance with one embodiment of the present invention, a method is provided for adaptively reducing a peak-to-average power ratio in a communication system. Energy is clipped from at least one peak of a modulated signal. The modulated signal includes a plurality of sub-carriers. At least one data sub-carrier is adaptively selected for peak-to-average power ratio reduction use based on known scheduling information. The clipped energy is adaptively distributed to at least one data sub-carrier.

In accordance with another aspect of the present invention, a system for adaptively reducing a peak-to-average power ratio in a communication system includes a scheduler, a clipper and a filter. The scheduler operates to adaptively select at least one data sub-carrier for peak to average power ratio reduction. The clipper operates to clip energy from at least one peak of a modulated signal. The modulated signal includes an orthogonal frequency division multiplexing symbol having a plurality of sub-carriers. The filter is communicatively coupled to the scheduler and to the clipper. The filter operates to adaptively distribute the clipped energy among to at least one data sub-carrier.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the present invention, it is noted that the embodiments reside primarily in combinations of apparatus components and processing steps related to implementing a system and method for reducing the peak-to-average power ratio ("PAPR") by adaptively distributing excess clipped energy among reserved and active sub-carriers in orthogonal frequency-division multiplexing ("OFDM") communication systems. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for reducing the PAPR by distributing excess energy among reserved and active sub-carriers in OFDM communication systems. Generally, a scheduler assigns users to different sub-carriers with different modulation schemes and tracks the current assignments. This information is used to interactively determine those sub-carriers on which additional noise is acceptable, as well as the amount of acceptable noise. The reduced PAPR reduces the overall system costs by allowing use of lower power amplifiers as well as increasing the flexibility of system configuration. Additionally, an embodiment of the present invention increases the overall system capacity by decreasing the number of sub-carriers reserved solely for excess noise effects and distributing these effects to active sub-carriers at a time when the noise has minimal negative impact on the system performance.

Examples of OFDM communication systems include, but are not limited to, wireless protocols such as the wireless local area network ("WLAN") protocol defined according to the Institute of Electrical and Electronics Engineering ("IEEE") standards radio 802.11a, b, g, and n (hereinafter "Wi-Fi"), the Wireless MAN/Fixed broadband wireless access ("BWA") standard defined according to IEEE 802.16 (hereinafter "WiMAX"), the mobile broadband 3GPP Long Term Evolution ("LTE") protocol having air interface High Speed OFDM Packet Access ("HSOPA") or Evolved UMTS Terrestrial Radio Access ("E-UTRA"), the 3GPP2 Ultra Mobile Broadband ("UMB") protocol, digital radio systems Digital Audio Broadcasting ("DAB") protocol, Hybrid Digital ("HD") Radio, the terrestrial digital TV system Digital Video Broadcasting-Terrestrial ("DVB-T"), the cellular communication systems Flash-OFDM, etc. Wired protocols using OFDM techniques include Asymmetric Digital Subscriber Line ("ADSL") and Very High Bitrate Digital Subscriber Line ("VDSL") broadband access, Power line communication ("PLC") including Broadband over Power Lines ("BPL"), and Multimedia over Coax Alliance ("MoCA") home networking.

The sub-carriers of the OFDM carriers may be modulated using a variety of modulation schemes, such as Binary phase-shift keying ("BPSK"), Quadrature phase-shift keying ("QPSK"), Quadrature amplitude modulation ("16QAM" or "64QAM"), etc.

Figure 1:
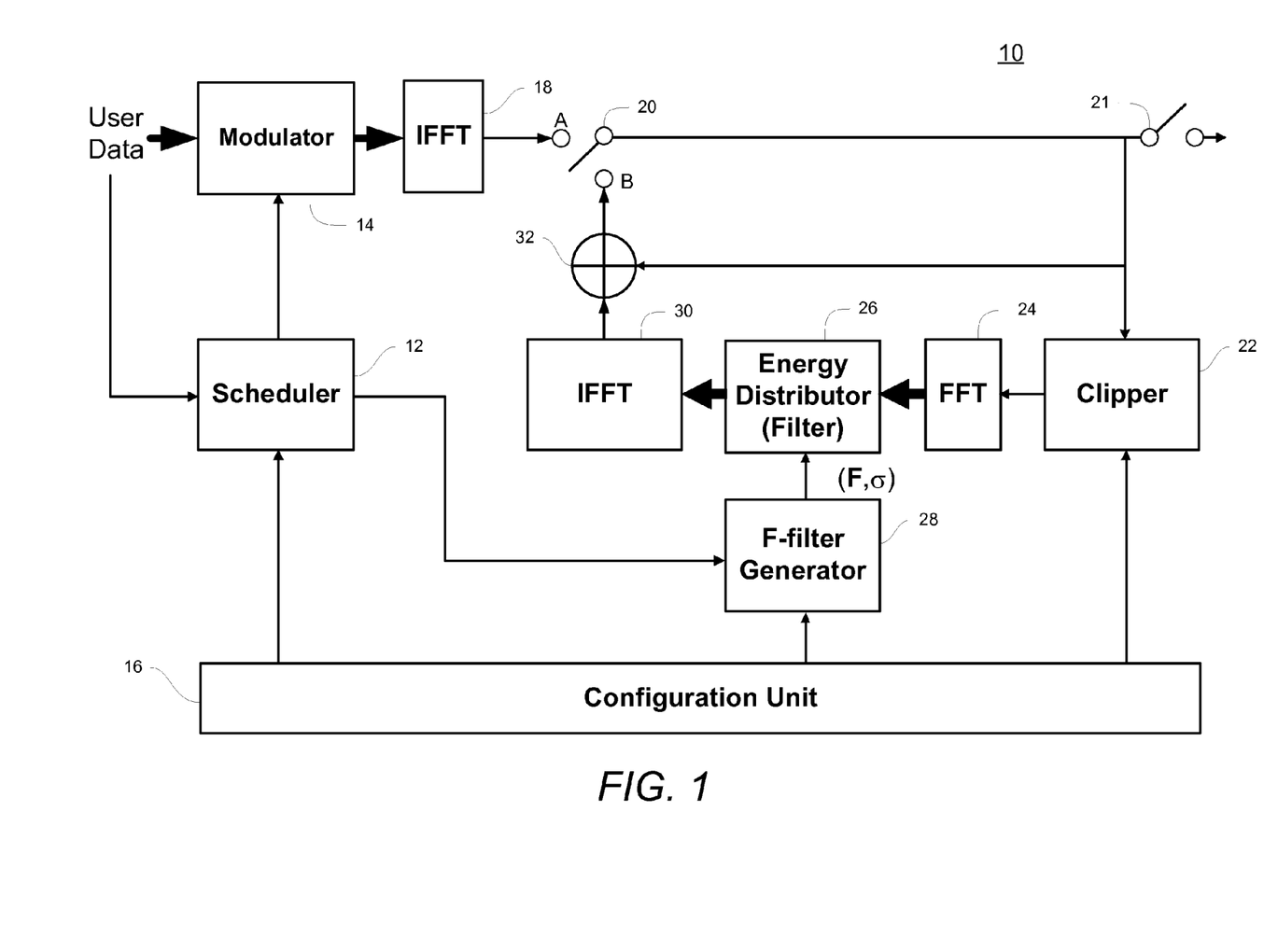
FIG. 1 is a block diagram of an exemplary peak-to-average power ratio reduction system constructed in the frequency domain in accordance with the principles of the present invention.

Referring now to the drawing figures in which like reference designators refer to like elements, there is shown in FIG. 1, a peak-to-average power ratio reduction ("PAPRR") system constructed in accordance with the principles of the present invention and designated generally as "10." PAPRR system 10 includes a scheduler 12 which determines when each OFDM symbol of a data packet is to be transmitted and maps the data onto an OFDM signal prior to modulation by the modulator 14. The scheduler 12 also assigns users to different sub-carriers with different modulation schemes, tracks the current assignments, and interacts with a configuration unit 16, such as a controller or processor, to determine which sub-carriers may be available for PAPR reduction.

The system throughput is generally a function of the scheduler properties and the number of reserved sub-carriers. In other words, Throughput=$f_1$ ($N_{rsch}$, Scheduler). A small number of reserved sub-carriers generally increases the system throughput at the expense of PAPR. Additionally, the scheduler 12 implements some type of fairness mechanism, such as proportional or weighted fairness. With a fair scheduler, an OFDM symbol may consist of sub-carriers with higher order, e.g., 64QAM, as well as lower order modulations, e.g., QPSK.

The residue constellation error ("RCE"), also known as error vector magnitude ("EVM") for certain protocols, is a measurement that reflects the distance from each actual data point to its ideal constellation point. RCE is a function of the PAPRR algorithm used, the number of reserved sub-carriers, the number of sub-carriers for different modulation schemes (e.g., 64QAM, 16QAM, etc.), and the scheduler properties. In other words, RCE=$f_2$(Algo$_{PAPRR}$, $N_{rech}$, $N_{64QAM}$, $N_{16QAM}$, Scheduler). The PAPRR algorithm controls the levels of constellation errors on different modulations according to the requirements. Generally, a larger number of reserved sub-carriers is needed in order to have a smaller RCE.

The scheduler 12 limits the number of symbols with higher order modulation, e.g., 64QAM. The scheduler 12 determines the number of reserved sub-carriers based, in part, on the number of symbols with higher order modulations and RCE requirements.

It should be noted that, in accordance with one embodiment of the present invention, constellation errors and sub-carriers are defined in the frequency domain. Scheduling and the bulk of actual processing are also performed in the frequency domain. Additionally, OFDM symbols are modulated onto an OFDM carrier signal in the frequency domain.

The modulated signal is converted to the time domain by passing the signal through an inverse fast Fourier transform ("IFFT") 18. A switch 20 operates to capture an OFDM symbol for PAPRR processing prior to transmission. When switch 20 is in position A, a single OFDM symbol is passed through from the modulator 14. The switch 20 then transitions to position B during the PAPRR processing of the OFDM symbol. A second switch 21, when in the open position, prevents the OFDM symbol from being transmitted until after the PAPRR processing has been completed.

The OFDM signal, in the time domain, is passed through a clipper 22 which clips the peaks of the signal, thereby limiting the peak power. Based on performance requirements received from the scheduler 12, the configuration unit 16 defines the target output PAPR level at the output by setting the clipping threshold, $TH_{clipping}$, used by the clipper 22. The signal containing the energy clipped from the peaks is transformed back to the frequency domain by a fast Fourier transform ("FFT") 24 and passed through an energy distributor filter 26 having coefficients determined by an F-filter generator 28 according to information from the scheduler 12 and the configuration unit 16 regarding the number of sub-carriers and their associated modulation scheme or reserved sub-carrier status. The energy distributor filter 26 distributes noise or distortion created by the clipping process onto sub-carriers where the scheduler 12 has indicated the additional noise may be tolerated. The filtered signal is transformed back to the time domain by a second IFFT 30 and combined with the original signal through a subtracter 32 which, in fact, removes the filtered clipped signal from the original modulated signal before being fed back through the clipper 22 for additional iterations. Ideally, the number of iterations approaches infinity; however, practical applications limit the number of iterations to generally about three or four. Further iterations do not yield significantly improved results, and are generally not needed.

The configuration unit 16 selects whether the number of iterations is fixed or variable, determines a re-growth control factor, σ, and defines the maximum and minimum amount of resources available for PAPRR use, e.g., in WiMAX, the total number of sub-carriers. The re-growth control factor σ is used to control the re-growth of the peaks after clipping and optimize the performance of the PAPRR process. The re-growth control factor discussed in greater detail below. The configuration unit 16 also defines the resource reservation function, $f_{RR}(\ )$, which determines the amount, $N_{rsch}$, of sub-channels reserved for PAPRR purposes according to the amount of sub-carriers modulated with specific modulation schemes. In other words, $N_{rsch}=f_{RR}(N_{64QAM}, N_{16QAM}, N_{QPSK})$. The configuration unit 16 communicates the resource reservation function to the scheduler 12 which uses this function in scheduling user data onto sub-carriers.

For example, in the hypothetical case of a WIMAX communication system which uses 64QAM modulation exclusively, the number of sub-channels reserved for PAPR may be simply a function of total number of sub-channels having 64QAM modulated sub-carriers. Thus, $$N_{rsch} = f_{RR}(N_{64QAM}) = \begin{cases} 0, & N_{64QAM} \leq 2; \\ 1, & 2 < N_{64QAM} \leq 4; \\ 2, & 4 < N_{64QAM} \leq 6; \\ 3, & 6 < N_{64QAM}. \end{cases} \quad (1)$$

Therefore, if the system has less than two $N_{64QAM}$ sub-channels with 64QAM modulation, no reserved sub-channels are required. If the system has between 2 and 4 $N_{64QAM}$ sub-channels with 64QAM modulation, one reserved sub-channel is needed, and so on.

Table 1 illustrates a more complex example of a WiMAX communication system which uses several modulation schemes. In this example, the number of reserved sub-carriers may be stored in the form of a look-up table.

TABLE 1

Number of Reserved Sub-channels Required for Different Modulation Schemes

| $N_{rsch}$ | $N_{QPSK}$ | $N_{16QAM}$ | $N_{64QAM}$ |
|---|---|---|---|
| 0 | 1 | 1 | 1 |
| 1 | 4 | 6 | 5 |
| ... | ... | ... | ... |
| $N_{rsch}$ | $N_{QPSK}$ | $N_{16QAM}$ | $N_{64QAM}$ |

Thus, according to the example shown in Table 1, with one reserved sub-channel, the system may support up to 4 QPSK sub-channels, 6 16QAM sub-channels, and 5 64QAM sub-channels and still meet its desired PAPR goals.

Additionally, the configuration unit 16 defines an energy distribution function, $f_{ED}(\ )$, based on the RCE or signal quality requirements. The energy distribution function determines a vector, F, of the weights on the pilot, the reserved sub-carriers, and the data sub-carriers modulated with different orders as $F=f_{ED}(RCE_{64QAM}, RCE_{16QAM}, RCE_{QPSK})$.

The scheduler 12 maintains a record of the quantity of sub-carriers assigned to the different modulation orders during scheduling, as well as the specific sub-carriers that have been assigned to the different modulation orders. Based on the distribution or combination of the resource amounts assigned to the different modulation orders, the scheduler 12 decides whether a unit of a resource, e.g., a particular sub-channel, shall be reserved for PAPRR purposes. The scheduler 12 communicates the mapping of modulated and PAPR reserved sub-carriers to the F-filter generator 28.

The F-filter generator 28 obtains the energy distribution function $f_{ED}(\ )$ and the re-growth control factor $\sigma$ from the configuration unit 16, and the sub-carrier mapping for each OFDM symbol from the scheduler 12. The F-filter generator 28 uses the energy distribution function $F_{ED}(\ )$, the re-growth control factor $\sigma$, and the sub-carrier mapping to generate the coefficients to construct an energy distributor filter 26 for each OFDM symbol.

One embodiment of the present invention calculates the F-filter coefficients by assuming that L modulation schemes exist within an OFDM symbol having $k_1, k_2, \ldots, k_L$ sub-carriers for each modulation scheme, respectively, then $$N_{sc} = \sum_{i=1}^{L} k_i. \tag{2}$$

The average energy of sub-carriers of scheme i, where $i=1, 2, \ldots, L$, is denoted as $E_i$. A power boost ratio of the sub-carriers with i-th scheme against $1^{st}$ scheme requires $dE_j$, $j=1, 2, \ldots, L$, where $$dE_j = \frac{E_j}{E_1}. \tag{3}$$

The set of sub-carriers with i-th modulation scheme is denoted as $SCS_i$. K schemes are used for PAPR reduction, and, without loss of generality, modulation scheme 1 has the highest order. Each scheme has $k_1, k_2, \ldots, k_K$ sub-carriers, respectively. The Residual Constellation Error requirements of each modulation scheme is denoted as $RCE_1, RCE_2, \ldots, RCE_K$, respectively, and are defined as $$RCE_i = \frac{Eclip_i}{E_i}, \tag{4}$$

where $Eclip_i$ denotes the average clipping interference energy on a sub-carriers of scheme i, where $i=1, 2, \ldots, K$. The RCE ratios are denoted as $dRCE_j$, where $j=2, \ldots, K$, and may be determined by $$dRCE_j = \frac{RCE_j}{RCE_1}. \tag{5}$$

The following calculations are performed:

$$Eclip_j = Eclip_i \cdot dE_j \cdot dRCE_j; \tag{6}$$

$$Aclip_j = (Eclip_j)^{1/2}; \tag{7}$$

with $Eclip_1 = 1$.

The F-filter coefficients $F = \{F_i | i=0, \ldots N-1\}$ are determined by finding $F_i$, where $$F_i = \begin{cases} Aclip_1, & i \in SCS_1 \\ Aclip_2, & i \in SCS_2 \\ \vdots \\ Aclip_K, & i \in SCS_K \\ 0, & \text{otherwise} \end{cases} \tag{8}$$

and normalizing the result.

A re-growth control factor $\sigma$ is used to reach the lowest PAPR with the required signal quality using the fewest number of iterations. When the clipped signal is converted to the frequency domain by the FFT 24, passed through the energy distributor filter 26, IFFT 30 and subtracter 32, the cancellation is imperfect, which has a tendency to push up the peak amplitude, in effect re-growing the peak. The re-growth control factor may be viewed as an "aggressiveness factor" which determines how quickly, i.e., how many iterations are needed, to reach the PAPR goal. The value of the re-growth control factor $\sigma$ is between 0 and 1 and is used to scale the coefficients. By using an appropriate $\sigma$, less iterations are needed to reach the desired PAPR. The re-growth control factor $\sigma$ is determined based on the number of reserved sub-carriers $N_{rsch}$, the combination of sub-carriers in different modulation orders (in numbers as well as positions), the iteration order $i_{ite}$, and the signal quality requirements. In other words, $\sigma(i_{ite}) = f_o(N_{rsch}, i_{ite}, N_{64QAM}, N_{16QAM}, N_{QPSK})$. Therefore, the re-growth factor can vary to adapt to the signal transmitted.

Figure 2:
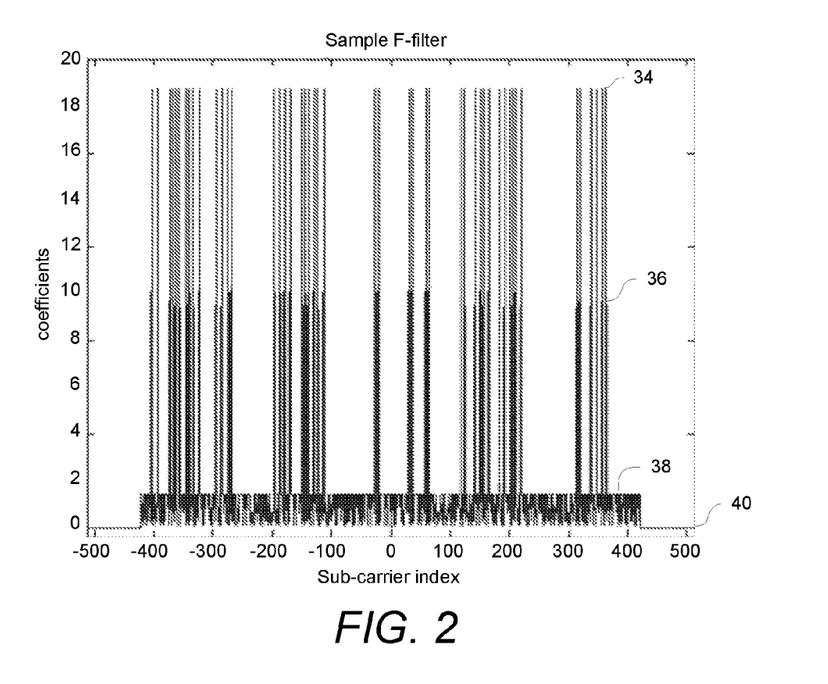
FIG. 2 is a graph of an exemplary F-filter response constructed in accordance with the principles of the present invention.

An exemplary energy distributor filter 26 is described with reference to FIG. 2. The energy distributor filter 26 is a frequency domain filter with F-filter coefficients. The energy distributor filter 26 selectively spreads the clipped energy from the peaks of the OFDM symbol onto sub-carriers according to the energy distribution function in order to satisfy the RCE requirements. Referring to the filter shown in FIG. 2, it should be noted that there are basically four levels of coefficients for this exemplary filter. The highest level 34 has a coefficient of approximately 19, thereby distributing the majority of the clipped energy to those sub-carriers designated with this coefficient. A second level 36 has a coefficient of approximately 10, and a third level 38 has a coefficient of approximately 1.5. The excess energy clipped from the peak OFDM signal is thus distributed across the carrier spectrum in proportion to the coefficient weights. It should be noted that sub-carriers near the band edges receive a coefficient of 0, i.e., level 40, thereby preventing any excess noise from being distributed to those sub-carriers Referring now to FIG. 3, an alternate embodiment of the present invention is provided wherein the PAPRR system 42 performs the actual filtering of the clipped OFDM signal in the time domain. As with the previous embodiment, a scheduler 12 determines when each OFDM symbol of a data packet is to be transmitted and maps the data onto an OFDM signal prior to modulation by the modulator 14. The scheduler 12 interacts with a configuration unit 16 to determine which sub-carriers are available for PAPR reduction. The modulated signal is converted to the time domain by passing the signal through an inverse fast Fourier transform ("IFFT") 18. A switch 20 operates to capture an OFDM symbol for PAPRR processing prior to transmission. When switch 20 is in position A, a single OFDM symbol is passed through from the modulator 14. The switch 20 transitions to position B during the PAPRR processing of the OFDM symbol. The OFDM signal, in the time domain, is passed through a clipper 22 which clips the peaks of the signal, thereby limiting the peak power. A second switch 21, when in the open position, prevents the OFDM signal from being transmitted until all iterations of the PAPRR processing are completed.

Figure 3:
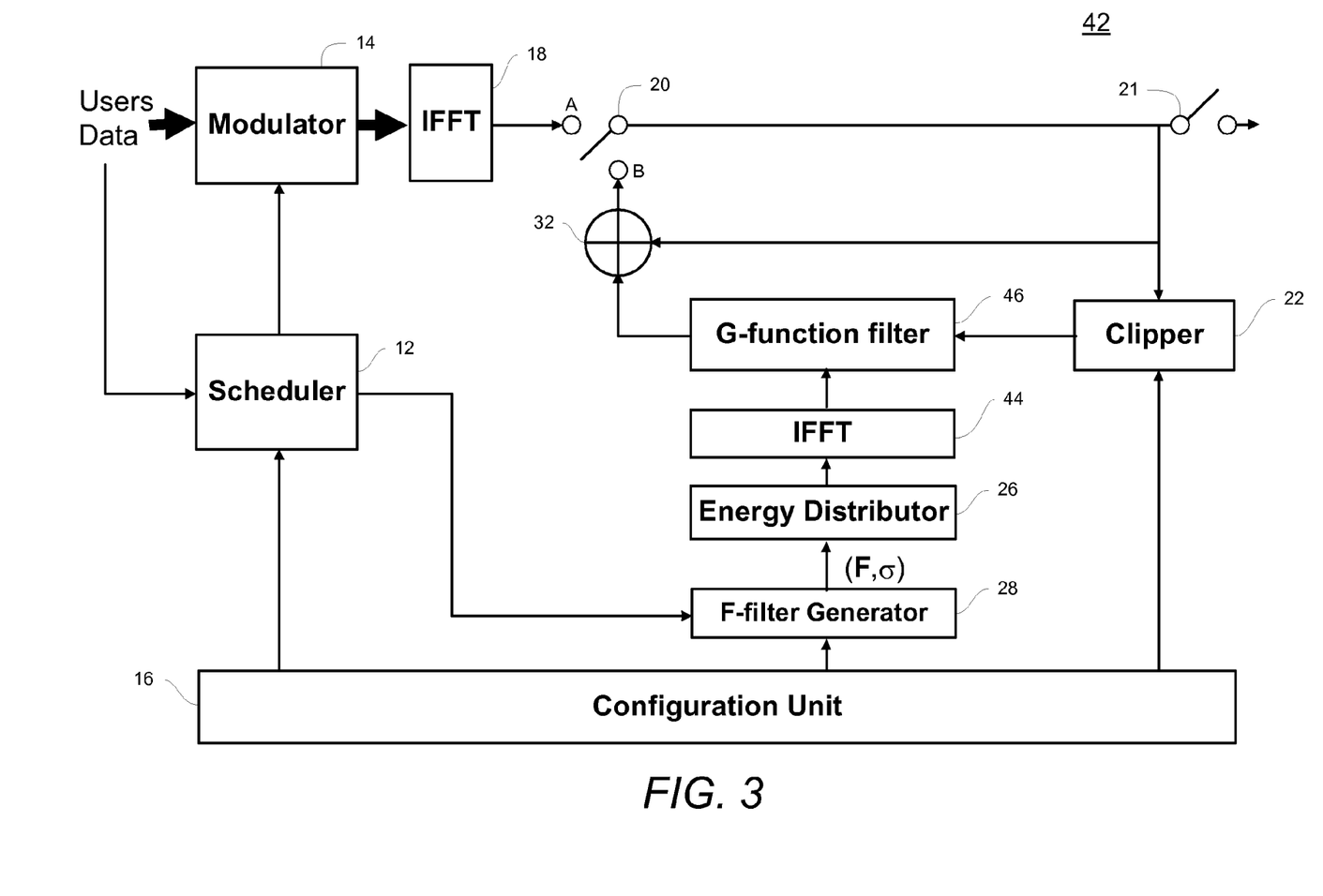
FIG. 3 is a block diagram of an alternative peak-to-average power ratio ("PAPR") reduction system constructed in the time domain in accordance with the principles of the present invention.
Figure 4:
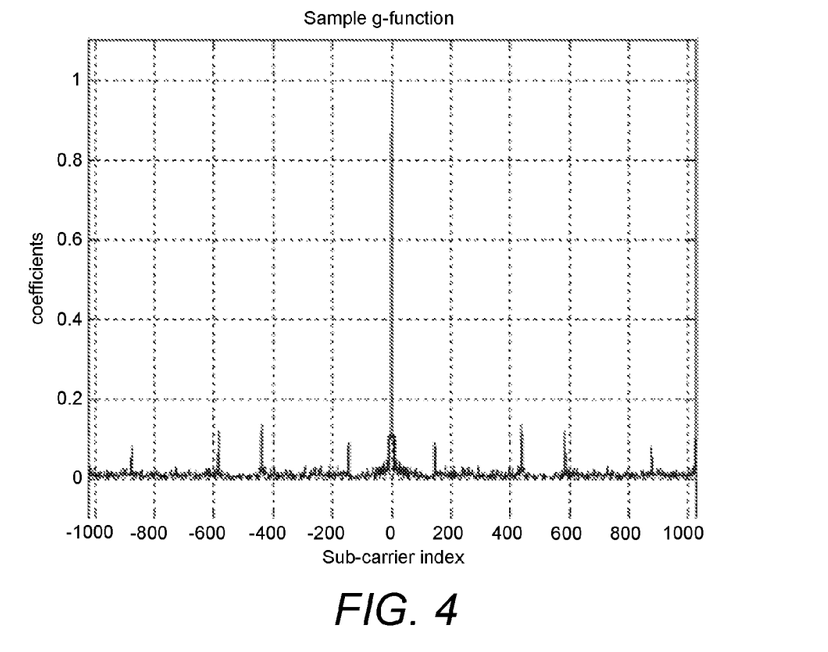
FIG. 4 is a graph of an exemplary g-function response constructed in accordance with the principles of the present invention.

Based on performance requirements received from the scheduler 12, the configuration unit 16 defines the target output PAPR level at the output by setting the clipping threshold, $TH_{clipping}$, used by the clipper 22. In this embodiment, energy distributor filter 26 still has its coefficients determined in the frequency domain by an F-filter generator 28 based on information from the scheduler 12 and the configuration unit 16 regarding the number of sub-carriers and their associated modulation schemes; however, the energy distributor filter 26 is transformed by an IFFT 44 into a g-function filter 46 which applies the filtering to the clipped signal in the time domain. As in the example above, the filtered signal is combined with the original signal through a subtracter 32 and the process is repeated for a number of iterations determined by the configuration unit 16. FIG. 4 illustrates the exemplary F-filter of FIG. 2, transformed to a complimentary g-function filter.

The adaptive PAPRR process of the present invention advantageously provides higher throughput than prior PAPRR methods, thus increasing system capacity. The present invention also provides better performance in PAPR reduction compared with prior art methods and is able to adapt to changes in the system loading while maintaining tight control on the signal quality, e.g., RCE. On-line generation of F-filter coefficients allows for a flexible configuration without greatly increasing the complexity of the PAPRR process.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for adaptively reducing a peak-to-average power ratio in a communication system, the method comprising:
clipping energy from at least one peak of a modulated signal, the modulated signal including a plurality of sub-carriers;
adaptively selecting at least one data sub-carrier for peak-to-average power ratio reduction use based on known scheduling information; and
distributing the clipped energy among the at least one data sub-carrier by filtering the clipped energy using a filter having coefficients based at least in part on a re-growth control factor, wherein the re-growth control factor is used to scale the coefficients of the filter, wherein a value of the re-growth control factor is between 0 and 1, wherein the re-growth control factor is used to control re-growth of the at least one peak after said clipping and iteratively repeating the distribution based on the regrowth control factor.

2. The method of claim 1, further comprising:
assigning communication devices to data sub-carriers;
mapping the orthogonal frequency division multiplexing symbol onto the modulated signal; and
determining the at least one data sub-carrier for distributing the clipped energy based on assigning the communication devices.

3. The method of claim 2, further comprising:
transforming the clipped signal for use in a frequency domain;
filtering the transformed signal using the filter;
transforming the filtered signal for use in a time domain; and
combining the transformed filtered signal with the modulated signal to produce an output signal having a peak-to-average power ratio less than the peak-to-average power ratio of the modulated signal.

4. The method of claim 3, wherein:
the filter includes a weighted coefficient for each sub-carrier.

5. The method of claim 4, wherein the coefficient for each sub-carrier is determined based at least in part on assigning the communication devices, a total amount of sub-carriers for the modulated signal, an amount of sub-carriers for each modulation scheme, an amount of reserved sub-carriers and signal quality parameters.

6. The method of claim 5, wherein the signal quality parameters include the peak-to-average power ratio for the output signal and residual constellation error for each sub-carrier.

7. The method of claim 2, further comprising:
filtering the clipped modulated signal using a g-function; and
combining the filtered clipped energy with the clipped modulated signal to produce an output signal having a peak-to-average power ratio less than the peak-to-average power ratio of the modulated signal.

8. The method of claim 7, wherein the g-function is constructed by:
constructing an F-filter in a frequency domain, the F-filter including a weighted coefficient for each sub-carrier; and
transforming the F-filter to a g-function for use in a time domain.

9. The method of claim 8, wherein the coefficient for each sub-carrier is determined based at least in part on assigning the communication devices, a total amount of sub-carriers for the modulated signal, an amount of sub-carriers for each modulation scheme, an amount of reserved sub-carriers and signal quality parameters.

10. A system for adaptively reducing a peak-to-average power ratio in a communication system, the system comprising:
- a scheduler operating to adaptively select at least one data sub-carrier for peak to average power ratio reduction;
- a clipper, operating to clip energy from at least one peak of a modulated signal, the modulated signal including an orthogonal frequency division multiplexing symbol having a plurality of sub-carriers; and
- a filter, communicatively coupled to the scheduler and to the clipper, the filter operating to adaptively distribute the clipped energy among the at least one data sub-carrier, the filter having coefficients based at least in part on a re-growth control factor, wherein the re-growth control factor is used to scale the coefficients of the filter, wherein a value of the re-growth control factor is between 0 and 1, wherein the re-growth control factor is used to control re-growth of the at least one peak after said clipping and iteratively repeating the distribution based on the regrowth control factor.

11. The system of claim 10, wherein the filter further operates to adaptively distribute the clipped energy among at least one reserved sub-carrier.

12. The system of claim 11, further comprising a filter generator communicatively coupled to the scheduler, the filter generator operating to create the filter, and wherein the scheduler further operates to:
- assign communication devices to data sub-carriers;
- map the orthogonal frequency division multiplexing symbol onto the modulated signal; and
- determine the at least one data sub-carrier for distributing the clipped energy based on assigning the communication devices.

13. The system of claim 12, wherein the filter is an F-filter, the F-filter including a weighted coefficient for each sub-carrier, the system further comprising:
- a fast Fourier transform communicatively coupled to the clipper and to the filter, the fast Fourier transform operating to transform the clipped modulated signal for use in a frequency domain;
- an inverse fast Fourier transform communicatively coupled to the filter, the inverse fast Fourier transform operating to transform the filtered clipped signal for use in a time domain; and
- a subtracter, communicatively coupled to the inverse fast Fourier transform and to the clipper, the subtracter operating to combine the transformed filtered clipped signal with the modulated signal to produce an output signal having a peak-to-average power ratio less than the peak-to-average power ratio of the modulated signal.

14. The system of claim 13, wherein the filter generator determines the coefficient for each sub-carrier based at least in part on assigning the communication devices, a total amount of sub-carriers for the modulated signal, an amount of sub-carriers for each modulation scheme, an amount of reserved sub-carriers, the peak-to-average power ratio for the output signal and residual constellation error for each sub-carrier.

15. The system of claim 14, further comprising a configuration unit communicatively coupled to the scheduler and to the filter generator, the configuration unit operating to:
- determine a number of iterations and a clipping threshold for the clipper;
- determine the re-growth control factor; and
- define a maximum and a minimum amount of sub-carriers available for peak-to-average power ratio reduction.

16. The system of claim 12, wherein the filter is a g-function, the filter generator operating to construct an F-filter in a frequency domain, the F-filter including a weighted coefficient for each sub-carrier, the system further comprising:
- an inverse fast Fourier transform communicatively coupled to the filter generator and to the filter, the inverse fast Fourier transform operating to transform the F-filter to the g-function for use in a time domain; and
- a subtracter, communicatively coupled to filter and to the clipper, the subtracter operating to combine the filtered clipped signal with the modulated signal to produce an output signal having a peak-to-average power ratio less than the peak-to-average power ratio of the modulated signal.

17. The system of claim 16, wherein the coefficient for each sub-carrier is determined based at least in part on assigning the communication devices, a total amount of sub-carriers for the modulated signal, an amount of sub-carriers for each modulation scheme, an amount of reserved sub-carriers and signal quality parameters.

18. The method of claim 1, wherein the re-growth control factor is determined based at least in part on a number of reserved sub-carriers.

* * * * *